(12) United States Patent
Lee

(10) Patent No.: US 12,059,995 B2
(45) Date of Patent: Aug. 13, 2024

(54) APPARATUS AND METHOD FOR CORRECTING LEVEL OF HEADLAMP

(71) Applicants: Hyundai Motor Company, Seoul (KR); Kia Corporation, Seoul (KR)

(72) Inventor: Jae Woong Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 575 days.

(21) Appl. No.: 17/479,512

(22) Filed: Sep. 20, 2021

(65) Prior Publication Data

US 2022/0314869 A1  Oct. 6, 2022

(30) Foreign Application Priority Data

Mar. 31, 2021   (KR) .................. 10-2021-0042173

(51) Int. Cl.
| | |
|---|---|
| *B60Q 1/08* | (2006.01) |
| *B60K 35/00* | (2006.01) |
| *B60Q 1/04* | (2006.01) |
| *B60Q 9/00* | (2006.01) |
| *G01S 13/08* | (2006.01) |
| *G01S 13/931* | (2020.01) |
| *G06V 20/58* | (2022.01) |

(Continued)

(52) U.S. Cl.
CPC ............... *B60Q 1/085* (2013.01); *B60K 35/00* (2013.01); *B60Q 1/045* (2013.01); *B60Q 9/00* (2013.01); *G01S 13/08* (2013.01); *G01S 13/931* (2013.01); *G06V 20/584* (2022.01); *B60K 35/23* (2024.01); *B60K 35/28* (2024.01); *B60K 2360/171* (2024.01); *G06T 7/11* (2017.01); *G06V 20/58* (2022.01); *G06V 20/625* (2022.01)

(58) Field of Classification Search
CPC .......... B60Q 1/085; B60Q 1/045; B60Q 9/00; G06V 20/584; G06V 20/625; G06V 20/58; B60K 35/00; B60K 2360/171; B60K 35/23; B60K 35/28; G01S 13/08; G01S 13/931; G06T 7/11
See application file for complete search history.

(56) References Cited

U.S. PATENT DOCUMENTS 9,135,709 B2 * 9/2015 Nonaka ..................... G06T 7/62
10,311,722 B2 * 6/2019 Pretorius ................ G08G 1/017

(Continued)

OTHER PUBLICATIONS

Hossan, Md Tanvir, et al. "A new vehicle localization scheme based on combined optical camera communication and photogrammetry." Mobile Information Systems 2018 (2018): 1-14.*

*Primary Examiner* — Shefali D Goradia
(74) *Attorney, Agent, or Firm* — Fox Rothschild LLP

(57) ABSTRACT

An apparatus and a method correct a level of a headlamp, in which a sight of the driver may be sufficiently secured while an influence on a sight of a driver of a preceding vehicle is minimized by specifying a level of a cutoff line of the headlamp using a transverse length and a longitudinal length of a number plate frame image. The specified level is compared with a level of a target line calculated based on a change of an inter-vehicle distance. The method includes determining whether it is necessary to perform a correction of raising or lowering the level of the headlamp, and a correcting the level of the headlamp such that the cutoff line of the headlamp follows the level of the target line at the corresponding inter-vehicle distance.

20 Claims, 17 Drawing Sheets

(51) Int. Cl.
  *B60K 35/23*   (2024.01)
  *B60K 35/28*   (2024.01)
  *G06T 7/11*    (2017.01)
  *G06V 20/62*   (2022.01)

(56) References Cited

U.S. PATENT DOCUMENTS

2018/0334083 A1\* 11/2018 Nakamura ........... B60Q 1/0023
2022/0201253 A1\*  6/2022 Lundberg ............... H04N 7/188

\* cited by examiner

<Height divided image when inter-vehicle distance is 15m>

<Height divided image when inter-vehicle distance is 10m>

<Height divided image when inter-vehicle distance is 5m>

<Automatic correction or warning after setting of target line through MFC>

APPARATUS AND METHOD FOR CORRECTING LEVEL OF HEADLAMP

CROSS-REFERENCE TO RELATED APPLICATION

This application claims the benefit of priority to Korean Patent Application No. 10-2021-0042173, filed on Mar. 31, 2021, the entire contents of which are incorporated herein by reference.

TECHNICAL FIELD

The present disclosure relates to an apparatus and a method for correcting a level of a headlamp, which may automatically correct a lighting angle of the headlamp to a preset ideal target line or induce a diver to perform a correction operation.

BACKGROUND

Headlamp leveling devices (HLLD) applied to vehicles recently include a switch type that requests a driver to perform an operation for adjusting a level of a headlamp and an automatic correction type that automatically adjusts a level of a headlamp. Then, according to the switch type, a driver corrects a height of a headlamp while moving a switch provided in a vehicle upwards and downwards, but it is not rarely used and it is not difficult to find a proper height.

Furthermore, the manual HLLD system may correct the height of the headlamp according to determination of the driver, but because an additional adjustment is not made even though a posture of the vehicle is changed once the height of the headlamp is corrected, an inconvenience may occur to a driver of a preceding vehicle or a vehicle on an opposite side when a lighting angle of the headlamp is high and a proper visual distance is unable to be secured when it is low to the contrary.

According to the automatic correction type, a height of a headlamp is found by using a sensor to automatically correct the height of the headlamp, but a total of two to four sensors used in a front axle and a rear axle thereof cause an increase of costs, and a level of the headlamp is excessively lowered since it is difficult to precisely sense the posture of the vehicle when only the rear axle sensors are used. Accordingly, even in the manual HLLD system, convenience of manipulation may be improved by allowing a driver to intuitively recognize whether it is necessary to adjust a level of a headlamp and by which degree the level of the headlamp is to be adjusted, and in the automatic HLLD system, a device for improving a precision of correction of a level of a headlamp through precise sensing while excluding causes of increase of costs by minimizing addition of sensors.

SUMMARY

The present disclosure has been made to solve the above-mentioned problems occurring in the prior art while advantages achieved by the prior art are maintained intact.

An aspect of the present disclosure is to provide an apparatus and a method for correcting a level of a headlamp, in which a sight of the driver may be sufficiently secured while an influence on a sight of a driver of a preceding vehicle may be minimized by specifying a level of a cutoff line of the headlamp by using a transverse length and a longitudinal length of a number plate frame image, comparing the specified level with a level of a target line calculated based on a change of an inter-vehicle distance, determining whether it is necessary to perform a correction of raising or lowering the level of the headlamp, and a correcting the level of the headlamp such that the cutoff line of the headlamp follows the level of the target line at the corresponding inter-vehicle distance.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for correcting a level of a headlamp may include a number plate frame image extractor configured to acquire a number plate frame image from an image of a preceding vehicle, which is captured by a camera provided in a vehicle, a number plate frame analyzer configured to calculate an inter-vehicle distance to the preceding vehicle using a transverse length of the number plate frame image, and divide a height standard of a rear area of the preceding vehicle, by which the number plate frame is spaced apart from a ground surface, into a plurality of unit areas, by using a longitudinal length of the number plate frame image, a headlamp level comparator configured to compare a level of a cutoff line, at which light of the headlamp reaches the preceding vehicle with a level of a target line that is a preset ideal cutoff line, and determine a necessity for correction of the level of the headlamp, and a headlamp level corrector configured to raise the level of the headlamp in response to determining that the level of the cutoff line is lower than the target line and lower the level of the headlamp when the level of the cutoff line is higher than the target line to perform a correction such that the cutoff line of the headlamp follows the level of the target line at the corresponding inter-vehicle distance.

Furthermore, the number plate frame analyzer may include a distance calculator configured to calculate the inter-vehicle distance to the preceding vehicle by using the transverse length of the number plate frame image, and a height standard divider configured to equally divide the height standard of the rear area of the preceding vehicle, by which the number plate frame is spaced apart from the ground surface, into heights of the plurality of unit areas, by using the longitudinal length of the number plate frame image. The distance calculator may be configured to calculate the inter-vehicle distance to the preceding vehicle by comparing the transverse length of the number plate frame image, which is measured on the number plate frame image, with a transverse length of a standard of a number plate to derive a proportional relationship thereof.

Additionally, the number plate frame analyzer may be configured to correct a result of the inter-vehicle distance calculated by the distance calculator, by using the inter-vehicle distance to the preceding vehicle, which is measured by a front radar sensor provided in the vehicle. The height standard divider may be configured to equally divide the longitudinal length of the number plate frame that appears on the number plate frame image into a plurality of unit areas having the same height, and then equally divide the height standard of the rear area of the preceding vehicle, from the lower end of the number plate frame to the ground surface, into the unit areas.

The headlamp level corrector may be configured to perform a correction of raising or lowering the level of the headlamp is automatically so that the cutoff line of the headlamp reaches the target line when a headlamp level adjusting device of an automatic correction type, by which the level of the headlamp is automatically adjusted. The correction may be performed by proactively performing a primary correction of the headlamp level according to a result recognized by a sensor provided therein when the headlamp level adjusting device of the automatic correction type is provided, and additionally raising or lowering the level of the headlamp such that the cutoff line of the headlamp reaches the target line by the headlamp level corrector.

Furthermore, the headlamp level corrector may be configured to output a voice or a popup message that requests performance of a correction of raising or lowering the level of the headlamp such that the cutoff line of the headlamp reaches the target line, when a headlamp level adjusting device of a switch type is provided. The apparatus may further include a headlamp level indicator configured to indicate the target line and the cutoff line together on the preceding vehicle image while indicating a front image including the preceding vehicle on a display unit provided in the vehicle. The headlamp level indicator may be configured to output the image of the preceding vehicle, the cutoff line, and the target line together on a windshield glass when the vehicle is provided with a head up display (HUD).

According to an aspect of the present disclosure, a method for correcting a level of a headlamp may include acquiring a number plate frame image from an image of a preceding vehicle, which is captured by a camera provided in a vehicle, calculating an inter-vehicle distance to the preceding vehicle by using a transverse length of the number plate frame image, and dividing a height standard of a rear area of the preceding vehicle, by which the number plate frame is spaced apart from a ground surface, into a plurality of unit areas, by using a longitudinal length of the number plate frame image, comparing a level of a cutoff line, at which light of the headlamp reaches the preceding vehicle with a level of a target line that is a preset ideal cutoff line, and determining a necessity for correction of the level of the headlamp, and raising the level of the headlamp in response to determining that the level of the cutoff line is lower than the target line and lowering the level of the headlamp when the level of the cutoff line is higher than the target line to perform a correction such that the cutoff line of the headlamp follows the level of the target line at the corresponding inter-vehicle distance.

The analyzing of the number plate frame may include calculating the inter-vehicle distance to the preceding vehicle by using the transverse length of the number plate frame image, and equally dividing the height standard of the rear area of the preceding vehicle, by which the number plate frame is spaced apart from the ground surface, into the plurality of unit areas, by using the longitudinal length of the number plate frame image. The calculating of the distance may include calculating the inter-vehicle distance to the preceding vehicle by comparing the transverse length of the number plate frame image, which is measured on the number plate frame image, with a transverse length of a standard of a number plate to derive a proportional relationship thereof.

Furthermore, a result of the inter-vehicle distance calculated in the calculating of the distance is corrected by using the inter-vehicle distance to the preceding vehicle, which is measured by a front radar sensor provided in the vehicle. The dividing of the height standard may include equally dividing the longitudinal length of the number plate frame that appears on the number plate frame image into a plurality of unit areas having the same height, and then equally dividing the height standard of the rear area of the preceding vehicle, from the lower end of the number plate frame to the ground surface, into heights of the unit areas.

In addition, the correcting of the headlamp level may include automatically performing a correction of raising or lowering the level of the headlamp so that the cutoff line of the headlamp reaches the target line when a headlamp level adjusting device of an automatic correction type, by which the level of the headlamp is automatically adjusted. The correction may be performed by proactively performing a primary correction of the headlamp level according to a result recognized by a sensor provided therein when the headlamp level adjusting device of the automatic correction type is provided, and additionally raising or lowering the level of the headlamp such that the cutoff line of the headlamp reaches the target line in the correcting of the headlamp level.

The correcting of the headlamp level may include outputting a voice or a popup message that requests performance of a correction of raising or lowering the level of the headlamp such that the cutoff line of the headlamp reaches the target line, when a headlamp level adjusting device of a switch type is provided. Furthermore, the method may further include indicating the target line and the cutoff line together on the preceding vehicle image while indicating a front image including the preceding vehicle on a display unit provided in the vehicle. The indicating of the headlamp level may include outputting the image of the preceding vehicle, the cutoff line, and the target line together on a windshield glass when the vehicle is provided with a head up display (HUD).

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
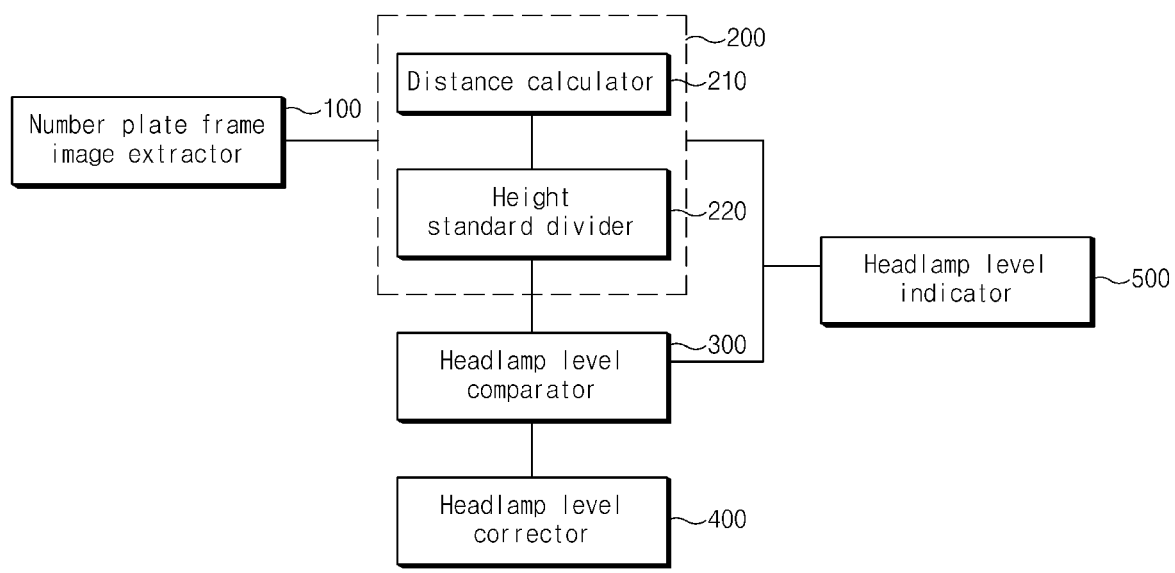
FIG. 1 is a block diagram of an apparatus for correcting a level of a headlamp according to the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 17. FIG. 1 is a block diagram of an apparatus for correcting a level of a headlamp according to the present disclosure.

Referring to FIG. 1, an apparatus for correcting a level of a headlamp according to the present disclosure may include a number plate frame image extractor 100 configured to acquire a number plate frame image from an image of a preceding vehicle, which is captured by a camera provided in a vehicle, a number plate frame analyzer 200 configured to calculate an inter-vehicle distance to the preceding vehicle by using a transverse length of the number plate frame image, and divide a height standard of a rear area of the preceding vehicle, by which the number plate frame is spaced apart from a ground surface, into a plurality of unit areas, by using a longitudinal length of the number plate frame image, a headlamp level comparator 300 configured to compare a level of a cutoff line, at which light of the headlamp reaches the preceding vehicle with a level of a target line that is a preset ideal cutoff line, and determine a necessity for correction of the level of the headlamp, and a headlamp level corrector 400 configured to raise the level of the headlamp in response to determining that the level of the cutoff line is lower than the target line and lowers the level of the headlamp when the level of the cutoff line is higher than the target line to perform a correction such that the cutoff line of the headlamp follows the level of the target line at the corresponding inter-vehicle distance.

The number plate frame image extractor 100 may be configured to extract the number plate frame image from the image of the preceding vehicle, which is captured by the camera provided in the vehicle, and measure a size of the extracted number plate frame image.

Figure 2:
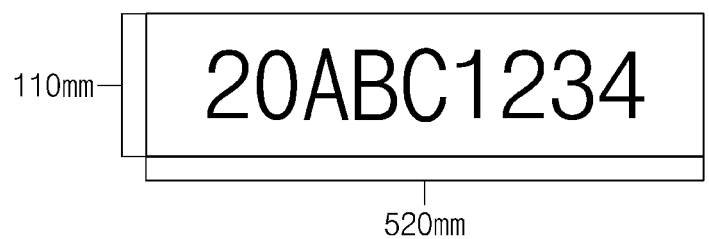
FIG. 2 is an exemplary view illustrating a standard of a number plate.
Figure 3:
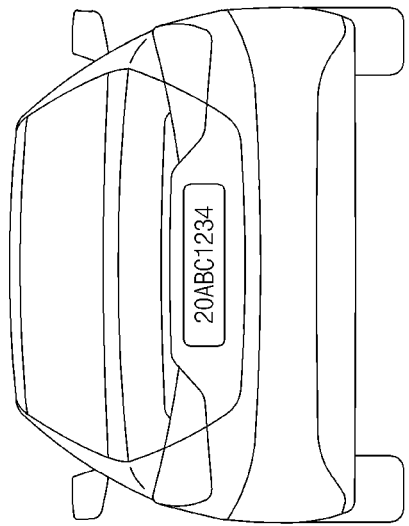
FIG. 3 is an exemplary view illustrating images of a preceding vehicle, which are captured at various inter-vehicle distances according to the present disclosure.
Figure 3:
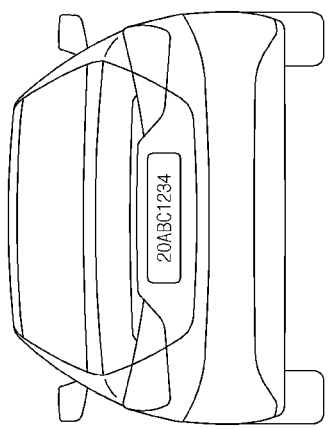
Figure 3:
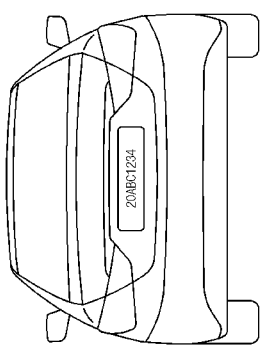

In general, the standards of the number plates are determined according to countries, and as illustrated in FIG. 2, the standard of the number plates of Korea is a transverse length of 520 mm and a longitudinal length of 110 mm. The size of the number plate frame image extracted in this way becomes smaller as an inter-vehicle distance, by which a preceding vehicle is spaced apart from a vehicle equipped with a camera, increases. In other words, as illustrated in FIG. 3, the size of the image of the preceding vehicle, which is captured by the camera, decreases as the inter-vehicle distance increases to 5 m, 10 m, and 15 m.

Figure 4:
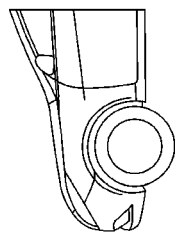
FIG. 4 is an exemplary view illustrating a difference of sizes of a number plate of a preceding vehicle, which are captured at various inter-vehicle distances according to the present disclosure.
Figure 4:
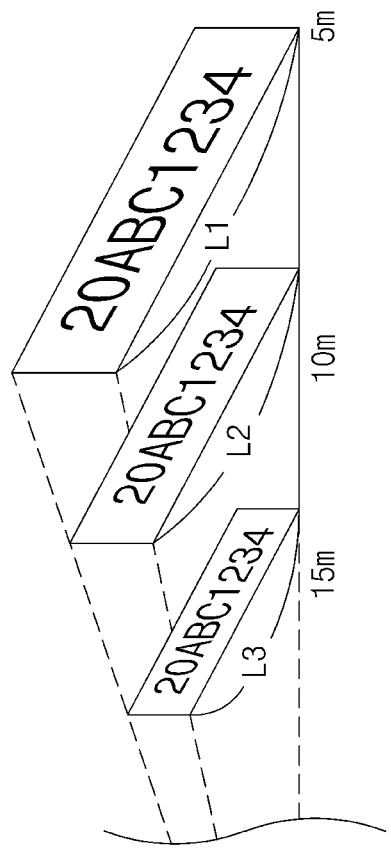

Accordingly, the transverse length of a number plate frame image extracted from the image of the preceding vehicle also decreases as the inter-vehicle distance increases, and as illustrated in FIG. 4, it is measured to be L1 when the inter-vehicle distance is 5 meters, it is measured to be L2 when the inter-vehicle distance is 10 meters, and it is measured to be 13 when the inter-vehicle distance is 15 meters. In other words, the transverse length of the number plate frame image decreases in proportion to an increase of the inter-vehicle distance.

The number plate frame analyzer 200 may include a distance calculator 210 configured to calculate the inter-vehicle distance to the preceding vehicle by using the transverse length of the number plate frame image, and a height standard divider 220 configured to equally divide the height standard of the number plate frame of the rear area of the preceding vehicle, by which the number plate frame is spaced apart from the ground surface, into the plurality of unit areas, by using the longitudinal length of the number plate frame image.

Then, the distance calculator 210 may be configured to calculate the inter-vehicle distance to the preceding vehicle by comparing the transverse length of the number plate frame image, which is measured on the number plate frame image, with a transverse length of a standard of a number plate to derive a proportional relationship thereof. In other words, as illustrated in FIGS. 3 and 4, since the size of the preceding vehicle and the size (particularly, the transverse length) of the number plate frame decreases in proportion to an increase of the inter-vehicle distance, the inter-vehicle distance to the preceding vehicle may be calculated by using a degree, by which the transverse length of the number plate frame of the specific standard decreases.

In this way, the distance calculator 210 may be configured to derive a level of a target line that is an ideal cutoff line of the headlamp at a calculated inter-vehicle distance by calculating the inter-vehicle distance to the preceding vehicle by using a proportional relationship, in which the transverse length of the number plate frame image decreases. Furthermore, the inter-vehicle distance to the preceding vehicle may be measured by a front radar sensor provided on the front side of the vehicle to detect whether an obstacle or a preceding vehicle is present and measure a distance to the obstacle or the preceding vehicle, and thus may be configured to correct the result of the inter-vehicle distance calculated by the distance calculator 210 and decrease an error of calculation of the distance.

Figure 5:
FIG. 5 is an exemplary view illustrating that a number plate image is divided at equal intervals to be recognized according to the present disclosure.
Figure 6:
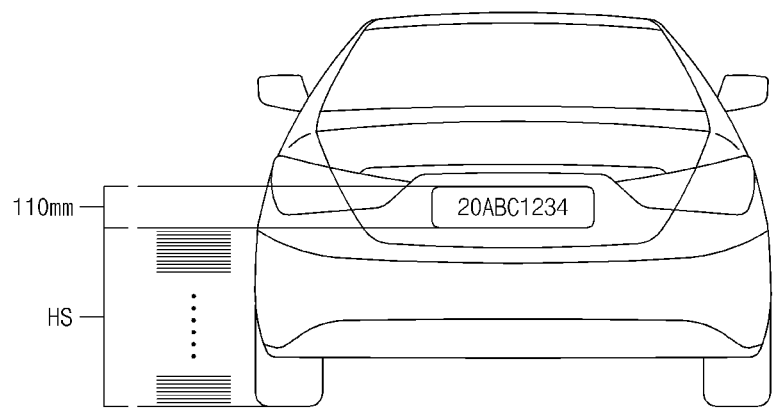
FIG. 6 is an exemplary view illustrating that a height of a number plate frame from a ground surface is calculated by using a division result of a number plate image according to the present disclosure.

The height standard divider 220 may be configured to equally divide the longitudinal length of the number plate frame that appears on the number plate frame image into a plurality of unit areas having the same height as illustrated in FIG. 5 and divide the rear area of the preceding vehicle from a lower end of the number plate frame to the ground surface into heights of the unit areas as illustrated in FIG. 6, and may be configured to calculate a sum of the heights of the unit areas as the height standard (HS) of the number plate frame. Then, the height standard, as illustrated in FIG. 6, refers to a height from the ground surface to the lower end of the number plate frame.

Accordingly, as an example of equally dividing the lengthwise length of the number plate into a plurality of unit areas, as illustrated in FIG. 5, a number plate frame having a longitudinal length of 110 mm may be divided into eleven unit areas having the same height of 10 mm. Then, the longitudinal length of the number plate frame may be different according to the standards of the number plates of the countries, and it is apparent that the heights of the unit area and the number of the unit areas that divide the longitudinal length of the number plate frame may be set differently without being limited to the example illustrated in FIG. 5.

Figure 7:
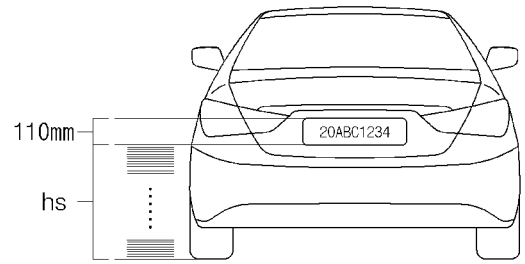
FIG. 7 is an exemplary view illustrating that heights of a number plate frame from a ground surface are calculated for various inter-vehicle distances according to the present disclosure.
Figure 7:
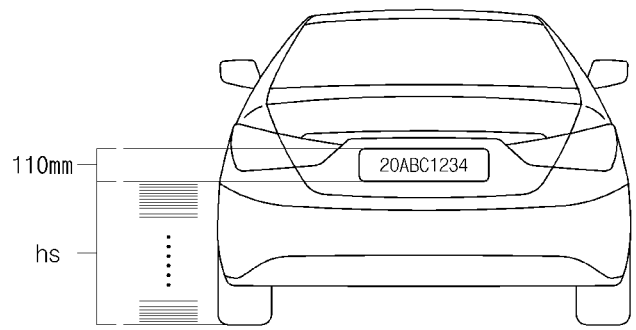
Figure 7:
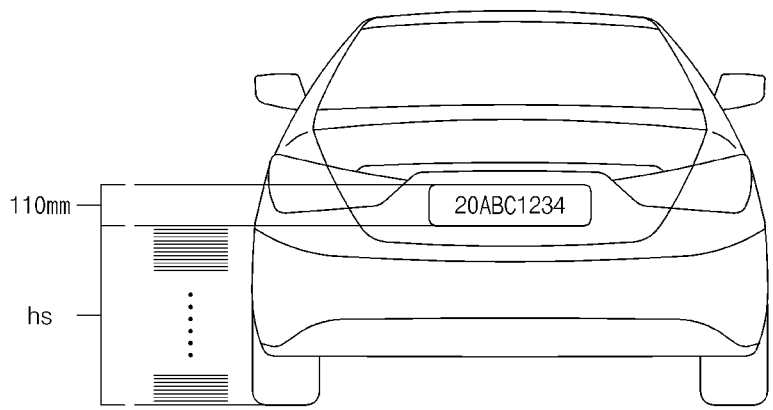

Accordingly, the height standard divider 220 may be configured to calculate a proportional relationship of the unit areas, in which the longitudinal length of the number plate frame is a fixed reference, without calculating the longitudinal length of the number plate frame by using a proportional relationship, in which the longitudinal length of the number plate frame increases relatively according to a change in the inter-vehicle distance to the preceding vehicle. As illustrated in FIG. 7, the height standard (HS) may be calculated in the same way when the inter-vehicle distances are 15 m, 10 m, and 5 m, without being influenced by an increment of the size of the image of the preceding vehicle, which is captured by the camera, and an increment of the size of the number plate frame image.

In other words, as long as the height standard (HS) that represents the height from the ground surface to the lower end of the number plate frame is calculated to be N unit area (here, N is an arbitrary integer) when the inter-vehicle distance is 10 m, the height standard may be calculated to be N unit areas in the same way even when the inter-vehicle distances are 15 m and 5 m. In this way, since the height standard is stably calculated without being influenced by the inter-vehicle distance, a change in the level of the cutoff line of the headlamp due to a relative change of the level of the cutoff line may be recognized, for example, when the front surface of the vehicle is raised or pressed and lowered due to passengers or the weight and a disposition of loaded cargo.

Furthermore, the headlamp level comparator 300 may be configured to determine whether the cutoff line of the headlamp is lower or higher than the target line due to the weights of the passengers on board or the loaded cargo or a change of the posture of the vehicle, such as a change in the locations thereof, by comparing the level of the cutoff line, at which the light of the headlamp reaches the preceding vehicle with the level of the target line. To achieve this, the headlamp level comparator 300 may be configured to determine to which unit area of the rear area of the preceding vehicle divided into the plurality of unit areas the level of the cutoff line, at which the light of the headlamp reaches the preceding vehicle, corresponds, to calculate the height standard (HS). The location of the cutoff line of the headlamp may be determined by a front camera including a multifunctional camera (MFC) provided in the vehicle in advance, and may be compared with the level of the target line calculated in advance according to the inter-vehicle distance.

Additionally, the headlamp level comparator 300 may be configured to calculate to which location of the rear area of the preceding vehicle the level of the target line that is an ideal cutoff line of the headlamp corresponds. Accordingly, the levels may be compared by recognizing the height standard of the rear area of the preceding vehicle with a set of the unit areas obtained by equally dividing the number plate frame of the preceding vehicle into a specific size and determining to which unit area of the plurality of unit areas that form the rear area of the preceding vehicle the cutoff line and the target line correspond while the locations of the cutoff line of the headlamp and the target line not being compared with numerical feature values.

Figure 8:
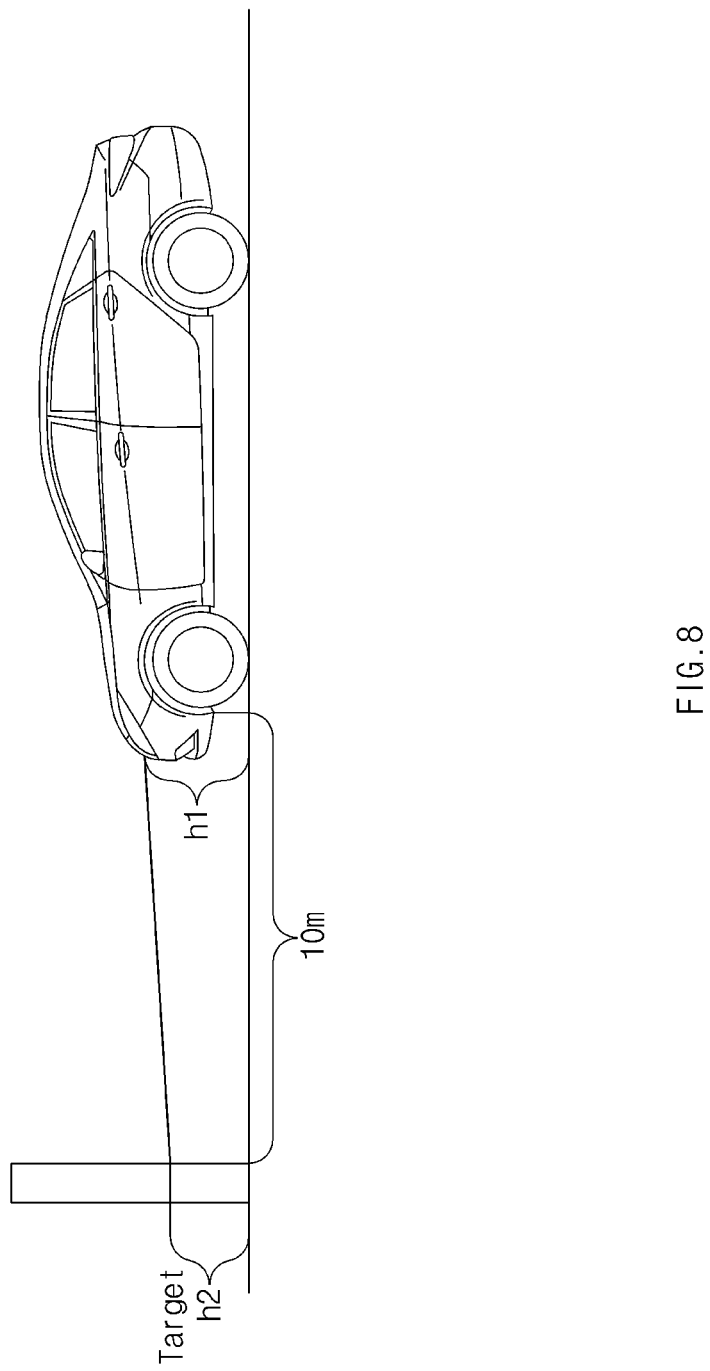
FIG. 8 is an exemplary view illustrating a target line that represents an ideal light angle of a headlamp according to the present disclosure.

In general, as illustrated in FIG. 8, it is defined as an ideal state when light irradiated at the height H1 of the headlamp installed in the vehicle is set to face the height h2 obtained by subtracting 100 mm from the height h1 of the headlamp at a location of the front side by 10 m. Accordingly, an OEM that manufactures a headlamp of a vehicle initially sets the headlamp such that the level of the cutoff line of the headlamp maintains the state.

Figure 9:
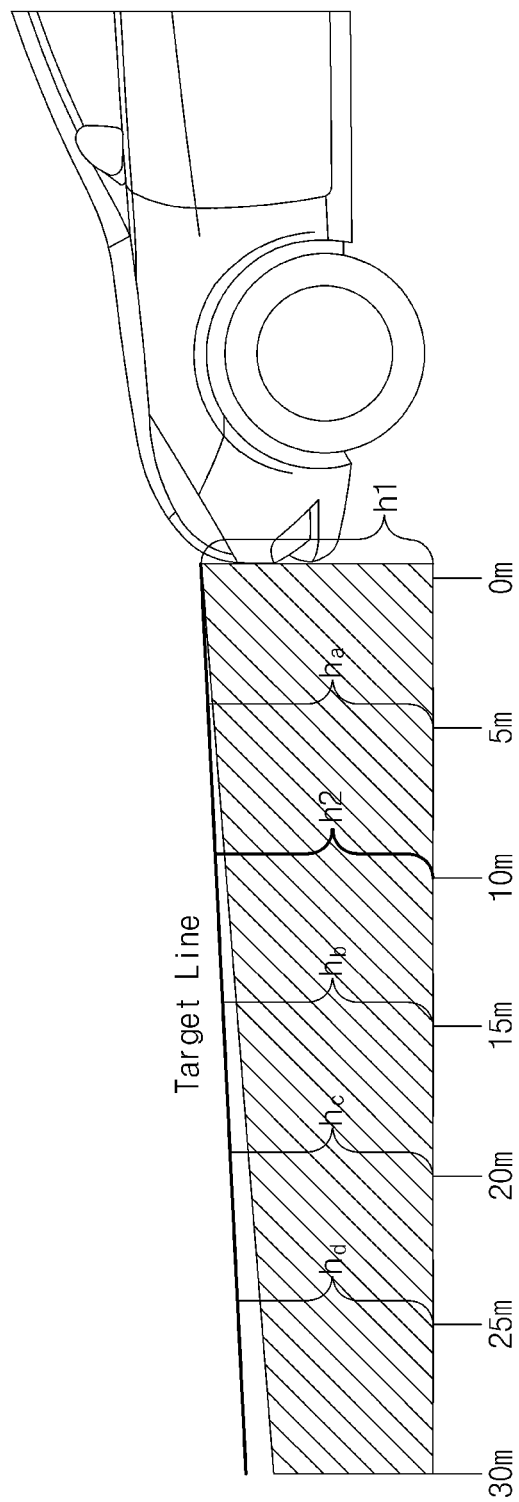
FIG. 9 is an exemplary view illustrating that a headlamp is excessively lowered.
Figure 10:
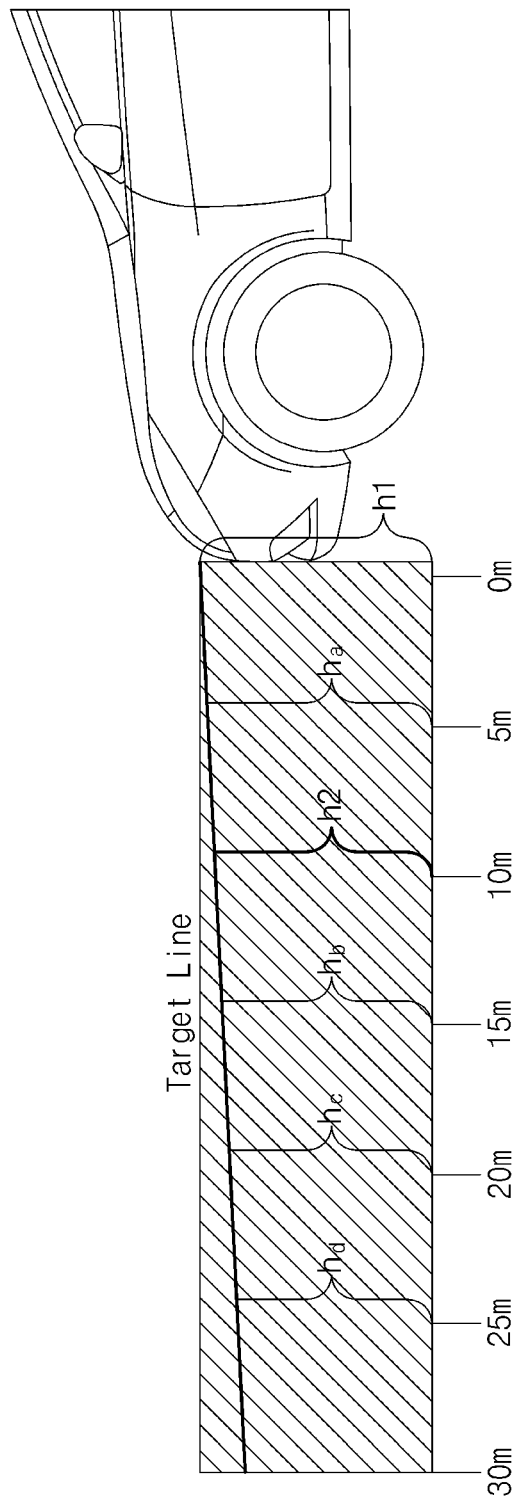
FIG. 10 is an exemplary view illustrating that a headlamp is excessively raised.

Accordingly, the line that faces the height of h2 (that is, a height of h1-100 mm) at a point of the front side by 10 m may be set to the ideal cutoff line that is the target line. The target line may be indicated by a straight line that faces the lower side from the headlamp as illustrated in FIGS. 9 and 10 while forming an angle of 0.57° calculated in Equation 1 that represents an initial setting condition. Then, in Equation 1, h1-h2 is 100 mm when the inter-vehicle distance is 10 m according to the general initial setting condition for setting the target line.

$$\text{target line angle} = \tan^{-1}\left(\frac{h1-h2}{10m} \times 100\right). \quad \text{Equation 1}$$

The light angle of the headlamp that is initially set to form the target line may be changed such that the cutoff line of the headlamp becomes lower than the target line due to various causes, such as when the front side of the vehicle is heavier than the rear side thereof. In particular, as illustrated in FIG. 9, the cutoff line of the headlamp may become lower than the target line as the inter-vehicle distance to the preceding vehicle increases, and this may hamper the driver from securing a sight during nighttime driving.

Furthermore, when the rear side of the vehicle becomes heavier, for example, when a passenger is on board or heavy cargo is loaded on the rear side of the vehicle, the front side of the vehicle may be raised such that the cutoff line of the headlamp becomes higher than the target line. In particular, as illustrated in FIG. 10, the cutoff line of the headlamp becomes higher than the target line as the inter-vehicle distance to the preceding vehicle increases, and thus a sight of the preceding vehicle or the driver of the vehicle that travels on a lane on an opposite side may be obstructed.

FIGS. 9 and 10 illustrate that the heights of the target lines become proportionally lower (having an inclination of about 0.57°) from $h_a$ to $h_d$ as the inter-vehicle distance increases by indicating the heights of the target lines calculated when the inter-vehicle distance ($h_x$) to the preceding vehicle is 5 m, 10 m, 15 m, 20 m, and 25 m, respectively, to "a" when x (here, x is the inter-vehicle distance) is 5 m, "b" when x is 15 m, "c" when x is 20 m, and "d" when x is 25 in. Then, a point corresponding to the inter-vehicle distance of 0 m, that is, the installation height of the headlamp is indicated by h1, and the height of the target line at a point corresponding to the inter-vehicle distance of 10 m that represents the initial setting condition for generating the target line is indicated by h2.

Figure 11:
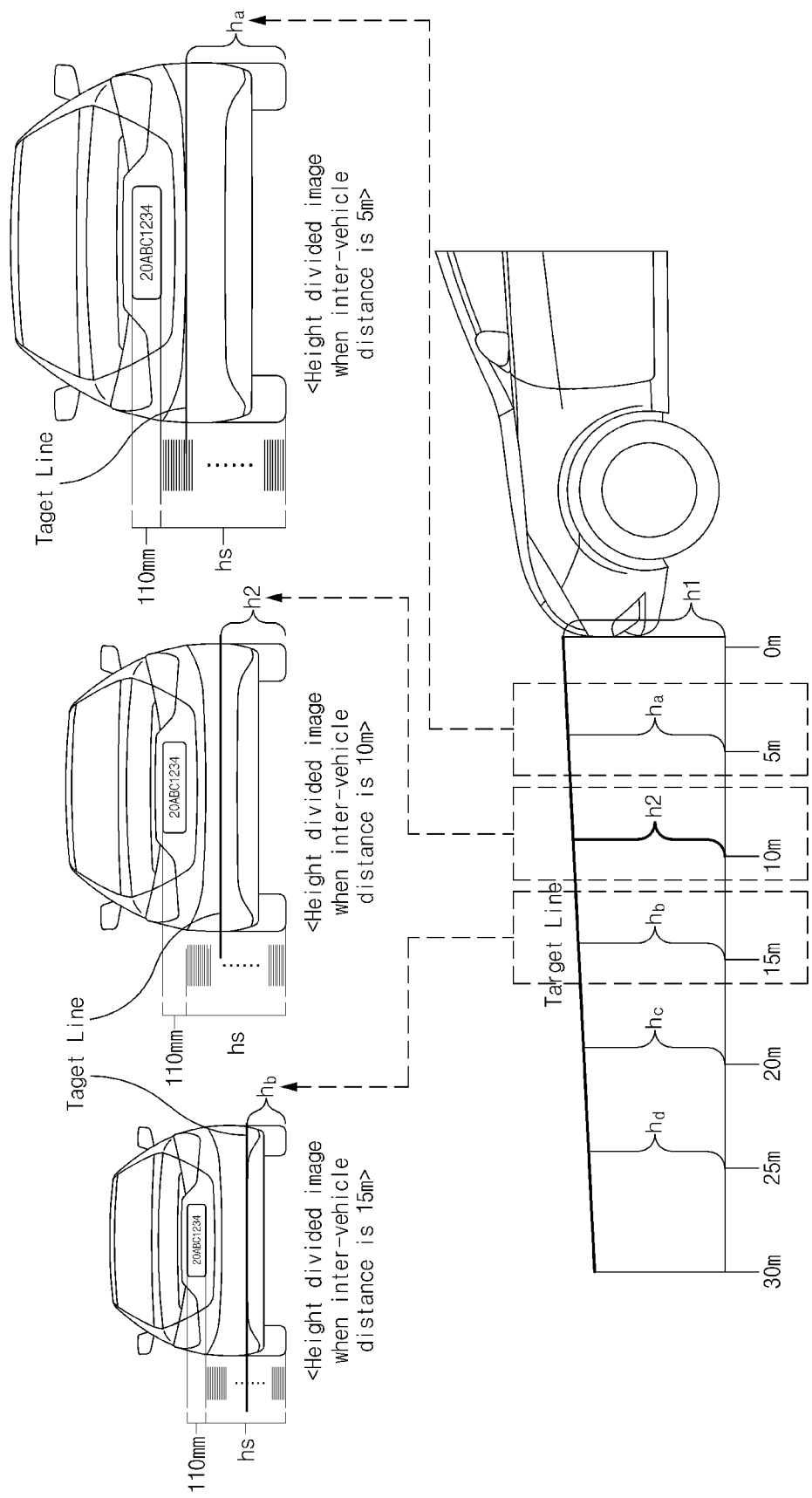
FIG. 11 is an exemplary view illustrating a state, in which a target line is lowered as an inter-vehicle distance to a preceding vehicle becomes larger, is applied to a vehicle according to the present disclosure.

Accordingly, when the level of the target line that becomes lower in proportion to a degree, by which the inter-vehicle distance increases, as illustrated in FIG. 11, it may be more clearly recognized that, among the unit areas that divide the height standard from the number plate frame to the ground surface, the locations of the unit areas matched with the level of the target line are different. In other words, FIG. 11 shows that on the divided image of the height of the preceding vehicle corresponding to the inter-vehicle distance of 5 m, the target line is formed at a location of $h_a$ that is closer to the height standard below the number plate, it may be identified on the divided image of the height of the preceding vehicle corresponding to the inter-vehicle distance of 10 m, the target line is formed at a location of h2 that is lower than $h_a$, and on the divided image of the height of the preceding vehicle corresponding to the inter-vehicle distance of 15 m the target line is formed at a location of $h_b$ that is lower than h2.

Then, although FIG. 11 illustrates that the target line is indicated on the image of the preceding vehicle while the interval of the inter-vehicle distances is 5 m, it is apparent that the interval of the inter-vehicle distances may be variously set. The headlamp level comparator 300, as illustrated in FIG. 12, may be configured to recognize the location of the target line determined with reference to the inter-vehicle distance calculated by using the transverse length of the number plate measured on the number plate image by the distance calculator with the locations of the unit areas that divide the height standard at an equal interval on the image of the preceding vehicle.

Figure 12:
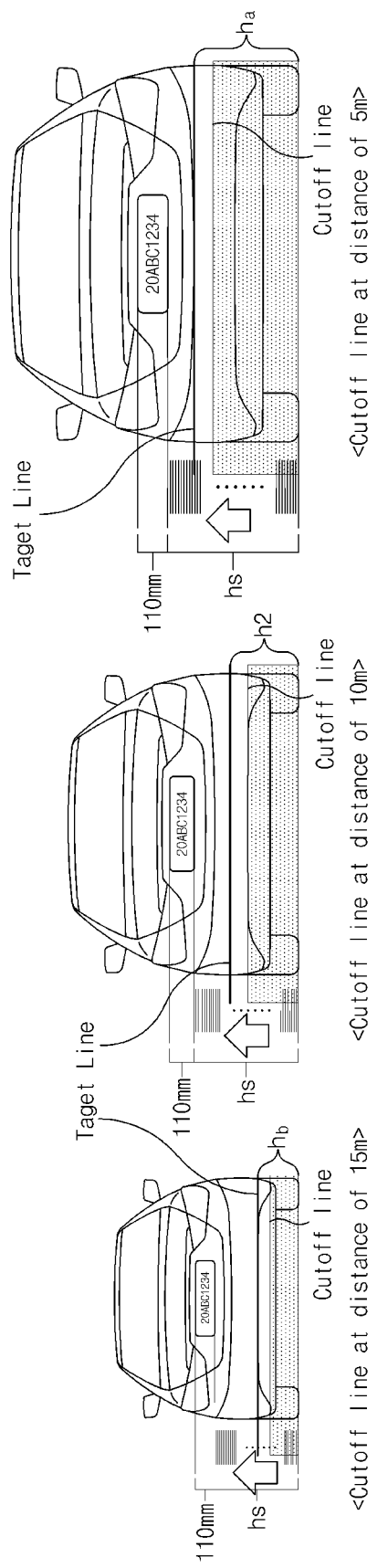
FIG. 12 is an exemplary view illustrating a state, in which a cutoff line of a headlamp is lower than a target line according to the present disclosure.
Figure 13:
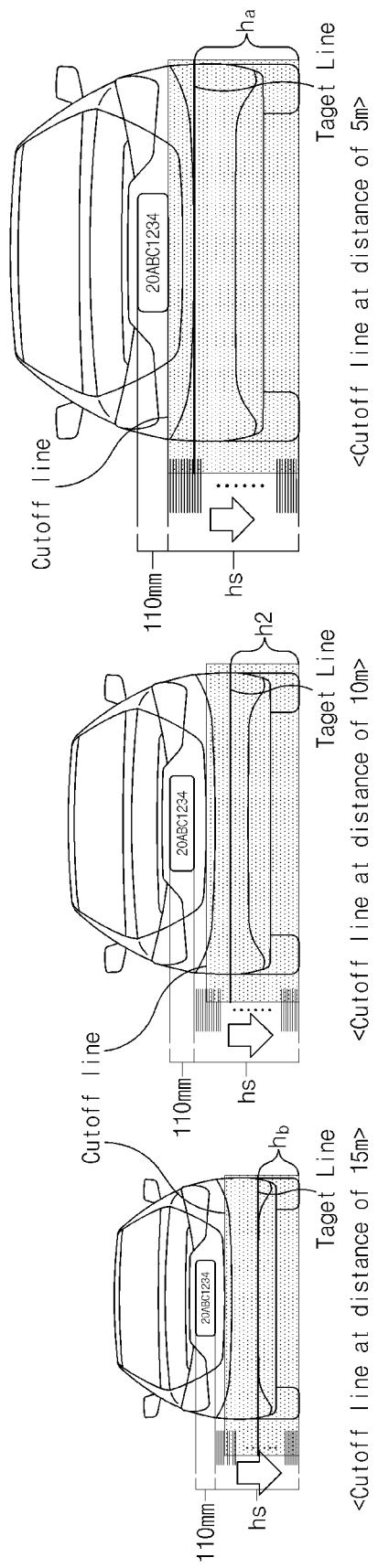
FIG. 13 is an exemplary view illustrating a state, in which a cutoff line of a headlamp is higher than a target line according to the present disclosure.

Furthermore, the headlamp level comparator 300, as illustrated in FIG. 12, may be configured to recognize the level of the cutoff line of the headlamp with the locations of the unit areas that divide the height standard at an equal interval. Accordingly, as illustrated in FIGS. 12 and 13, the cutoff lines of the headlamp and the target lines are located together on the images of the preceding vehicle captured when the inter-vehicle distances are 5 m, 10 m, and 15 m, respectively, to more easily compare the location of the cutoff line and the target line. In FIGS. 12 and 13, the locations of the target line are indicated by lines that represent the heights from the ground surface, such as ha, h2, and hb, and the current cutoff line of the headlamp is indicated by a shading area from the ground surface to a specific height, for convenience of comparison.

Then, FIG. 12 illustrates that the cutoff lines are at locations that are lower than the target line when the inter-vehicle distances are 5 m, 10 m, and 15 m, respectively, and FIG. 13 illustrates that the cutoff lines of the headlamp are at locations that are higher than the target line when the inter-vehicle distances are 5 m, 10 m, and 15 m, respectively. When the cutoff line is lower or higher than the target line according to the comparison result of the headlamp level comparator 300, it may be determined that the lighting angle of the headlamp deviates from an ideal state and thus it may be determined that a correction of raising or lowering the level of the headlamp is required to follow the level of the target line.

The headlamp level corrector 400 may be configured to perform a correction of raising the level of the headlamp such that the cutoff line reaches the height of the target line when the level of the cutoff line is lower than the target line and to perform a correction of lowering the level of the headlamp such that the cutoff line reaches the height of the target line when the level of the cutoff line is higher than the target line. Then, when a headlamp leveling device (HLLD) of an automatic correction type, which may automatically adjust the level of the headlamp, is provided, the headlamp level corrector 400 may be configured to automatically perform a correction of raising or lowering the level of the headlamp such that the cutoff line of the headlamp reaches the target line, whereby the light of the headlamp may be minimized from causing inconvenience to driving of the preceding vehicle or the vehicle that travels on an opposite lane while a sight of the driver is stably secured.

Accordingly, when the headlamp leveling device (HLLD) of an automatic correction type is provided, a primary correction of the lighting angle of the headlamp is promptly performed according to a result recognized by a sensor and the like provided therein, and then, the lighting angle of the headlamp may be additionally raised or lowered to reach the target line by the headlamp level corrector 400. Furthermore, when the headlamp leveling device (HLLD) of a switch type, in which adjustment of the level of the headlamp depends on manipulation by the driver, is provided, the headlamp level corrector 400 may be configured to output an indication such as a warning that requests performance of a correction of raising or lowering the level of the headlamp such that the cutoff line of the headlamp reaches the target line is provided in a form of a voice or a message including a popup window may be recognized by the driver.

Figure 14:
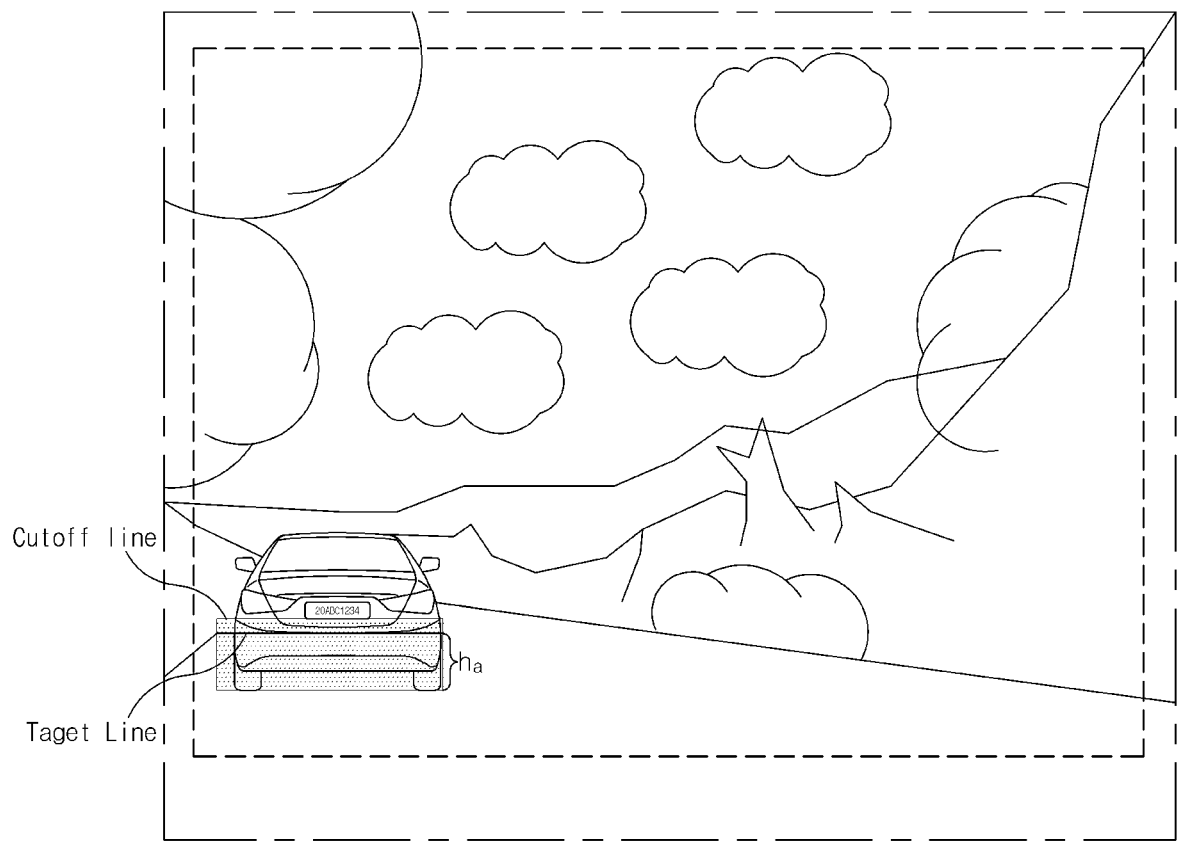
FIG. 14 is an exemplary view illustrating that a comparison result of a target line of a headlamp and a cutoff line of a headlamp is indicated on an output screen of a multifunctional camera (MFC) according to the present disclosure.

To achieve this, an embodiment of the present disclosure may further include a headlamp level indicator 500 that allows the driver to intuitively recognize whether it is necessary to correct the lighting angle of the headlamp and provides information on a correction direction and a correction degree together by outputting a front image including the preceding vehicle on the display unit provided in the vehicle and indicating the target line and the cutoff line together on the image of the preceding vehicle in a superimposition way. Accordingly, the headlamp level indicator 500, as illustrated in FIG. 14, may be configured to output or indicate the image of the preceding vehicle, the cutoff line, and the target line together on the display unit that displays the image of the multifunctional camera (MFC).

Figure 15:
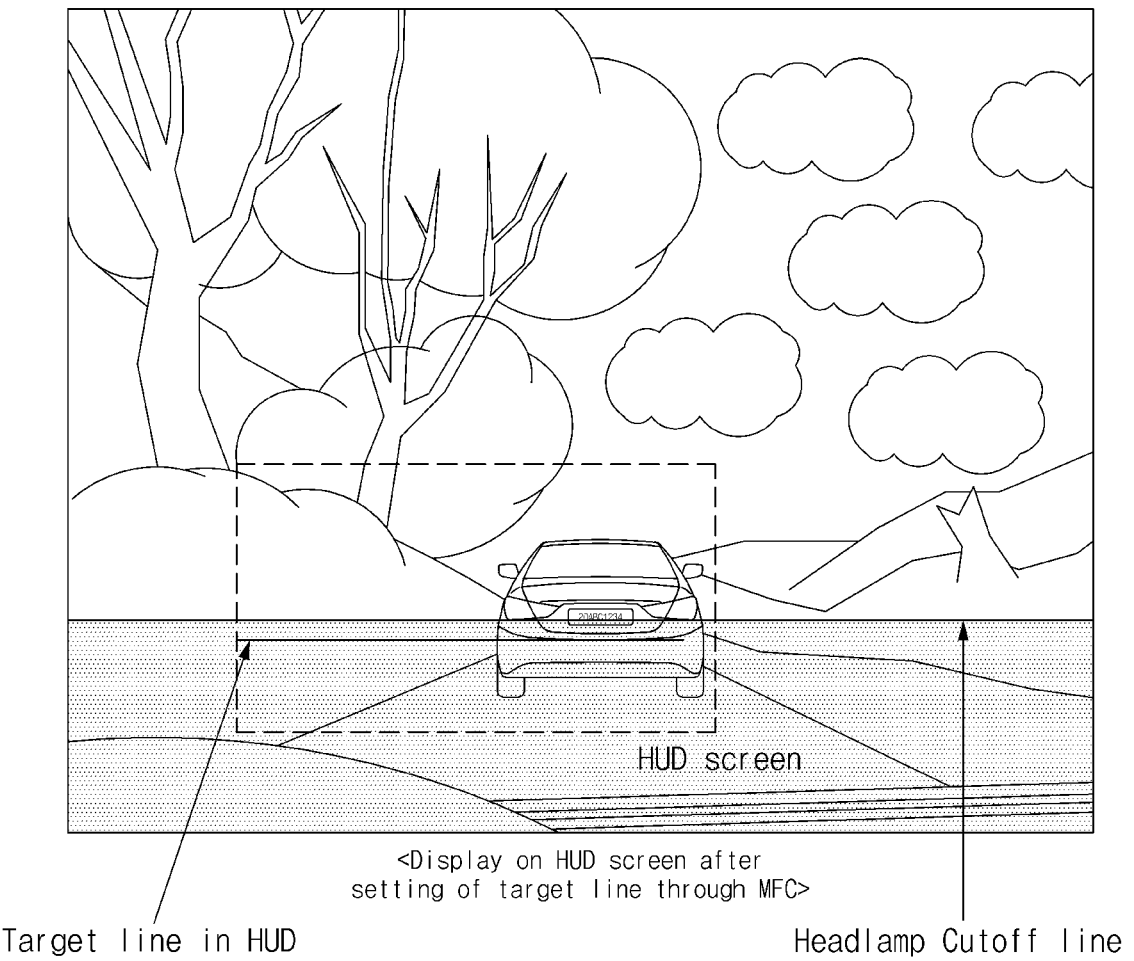
FIG. 15 is an exemplary view illustrating that a comparison result of a target line of a headlamp and a cutoff line of a headlamp is indicated on a windshield glass through a head up display (HUD) according to the present disclosure.

When data that may be visually recognized by the driver may be indicated on a windshield glass through a head-up display (HUD) provided in the vehicle, the headlamp level indicator 500, as illustrated in FIG. 15, may be configured to output the image of the preceding vehicle, which is captured by the multifunctional camera (MFC) provided in the vehicle, the cutoff line, and the target line together on the windshield glass. Then, in a HUD screen illustrated in FIG. 15, a distance, by which the cutoff line has to be raised or lowered to follow the height of the target line, may be calculated and indicated together.

Figure 16:
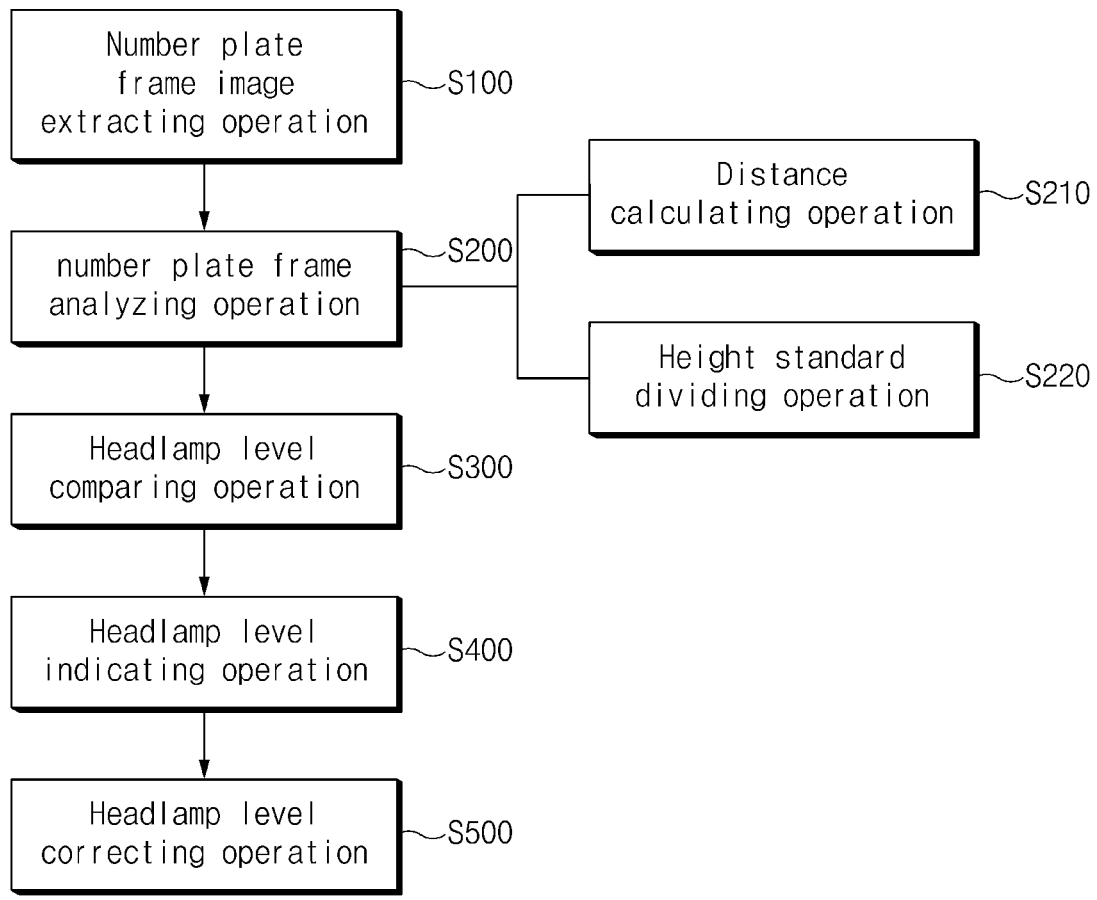
FIG. 16 is a block diagram of a method for correcting a level of a headlamp according to the present disclosure.
Figure 17:
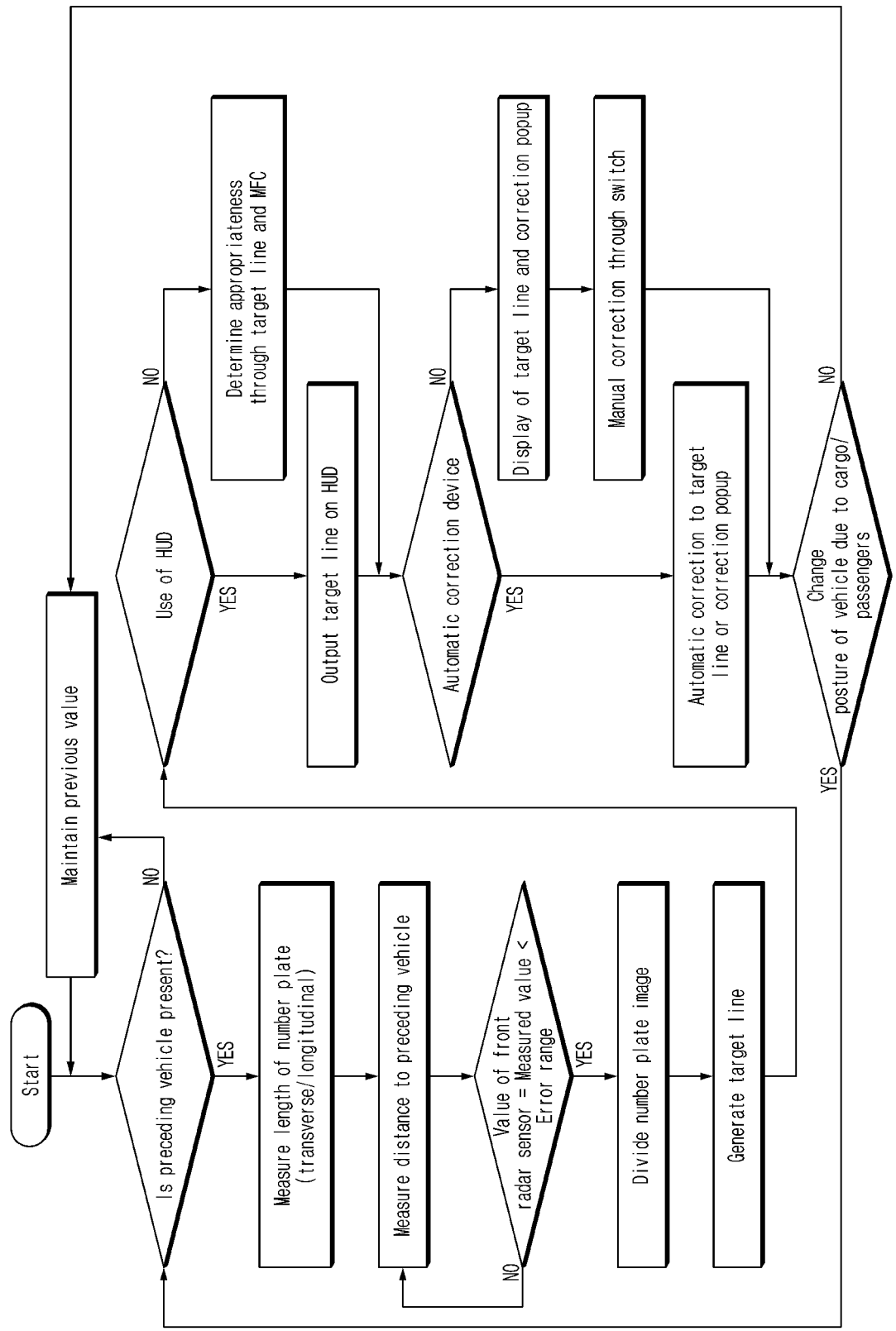
FIG. 17 is a flowchart illustrating a flow of determining whether correction of a level of a headlamp is necessary, and automatically correcting the level of the headlamp or requesting a driver for correction according to the present disclosure.

Next, a method for correcting a level of a headlamp according to another embodiment of the present disclosure will be described with reference to FIGS. 16 and 17. Referring to FIG. 16, a method for correcting a level of a headlamp according to another embodiment of the present disclosure may include a number plate frame image extracting operation S100 of acquiring a number plate frame image from an image of a preceding vehicle, which is captured by a camera provided in a vehicle, a number plate frame analyzing operation S200 of calculating an inter-vehicle distance to the preceding vehicle by using a transverse length of the number plate frame image, and dividing a height standard of a rear area of the preceding vehicle, by which the number plate frame is spaced apart from a ground surface, into a plurality of unit areas, by using a longitudinal length of the number plate frame image, a headlamp level comparing operation S300 of comparing a level of a cutoff line, at which light of the headlamp reaches the preceding vehicle with a level of a target line that is a preset ideal cutoff line, and determining a necessity for correction of the level of the headlamp, and a headlamp level correcting operation S400 of raising the level of the headlamp in response to determining that the level of the cutoff line is lower than the target line and lowering the level of the headlamp when the level of the cutoff line is higher than the target line to perform a correction such that the cutoff line of the headlamp follows the level of the target line at the corresponding inter-vehicle distance.

In the number plate frame image extracting operation S100, the number plate frame image may be extracted from the image of the preceding vehicle, which is captured by the camera provided in the vehicle, and a size of the extracted number plate frame image may be measured. The size of the number plate frame image becomes smaller in proportion to an increase of the inter-vehicle distance, by which the preceding vehicle is spaced apart from the vehicle including the camera. In other words, because the size of the image of the preceding vehicle decreases as the inter-vehicle distance increases, the transverse length of the number plate frame image extracted from a portion of the preceding vehicle also decrease in proportion to a degree, by which the inter-vehicle distance increases.

The number plate frame analyzing operation S200 may include a distance calculating operation S210 of calculating the inter-vehicle distance to the preceding vehicle by using the transverse length of the number plate frame image, and a height standard dividing operation 220 of equally dividing the height standard of the rear area of the preceding vehicle, by which the number plate frame is spaced apart from the ground surface, into the plurality of unit areas, by using the longitudinal length of the number plate frame image. Then, in the distance calculating operation S210, the inter-vehicle distance to the preceding vehicle may be calculated by comparing the transverse length of the number plate frame, which is measured on the number plate frame image, with a transverse length of a standard of a number plate to derive a proportional relationship thereof.

Since the size of the preceding vehicle and the size (particularly, the transverse length) of the number plate frame decreases in proportion to an increase of the inter-vehicle distance, the inter-vehicle distance to the preceding vehicle may be calculated using a degree, by which the transverse length of the number plate frame of the specific standard decreases. Accordingly, in the distance calculating operation S210, a level of a target line that is an ideal cutoff line of the headlamp from a calculated inter-vehicle distance may be derived by calculating the inter-vehicle distance to the preceding vehicle by using a proportional relationship, in which the transverse length of the number plate frame image decreases.

Furthermore, an error in calculation of the inter-vehicle distance to the preceding vehicle may be decreased by correcting a result of the inter-vehicle distance calculated in the distance calculating operation S210 by using the inter-vehicle distance measured by a front radar sensor provided in the vehicle. In the height standard dividing operation 220, the longitudinal length of the number plate frame that appears on the number plate frame image into a plurality of unit areas having the same height may be equally divided and then the rear area of the preceding vehicle from a lower end of the number plate frame to the ground surface into heights of the unit areas may be divided into heights of the unit areas, and a sum of the heights of the unit areas may be calculated as the height standard (HS) of the number plate frame. In particular, the height standard (HS) refers to a height from the ground surface to the lower end of the number plate frame.

Then, the longitudinal length of the number plate frame may be different according to the standards of the number plates of the countries, and it is apparent that the heights of the unit area and the number of the unit areas that divide the longitudinal length of the number plate frame may be variously set without being limited to the specific embodiment. Furthermore, in the headlamp level comparing operation S300, it may be determined whether the cutoff line of the headlamp is lower or higher than the target line due to a change of the posture of the vehicle and the like by comparing the level of the cutoff line, at which the light of the headlamp reaches the preceding vehicle with the level of the target line To achieve this, in the headlamp level comparing operation S300, it may be determined to which unit area of the rear area of the preceding vehicle divided into the plurality of unit areas to calculate the height standard (HS) the level of the cutoff line, at which the light of the headlamp reaches the preceding vehicle, corresponds. Further, in the headlamp level comparing operation S300, it may be calculated to which location of the rear area of the preceding vehicle the level of the target line that is an ideal cutoff line of the headlamp corresponds.

Accordingly, in the headlamp level comparing operation S300, the levels may be compared by recognizing the height standard of the rear area of the preceding vehicle with a set of the unit areas obtained by equally dividing the number plate frame of the preceding vehicle into a specific size and determining to which unit area of the plurality of unit areas that form the rear area of the preceding vehicle the cutoff line and the target line correspond while the locations of the cutoff line of the headlamp and the target line not being compared with numerical feature values.

In the headlamp level comparing operation S300, the lighting angle of the headlamp may be determined to deviate from an ideal state and thus it may be determined that a correction of raising or lowering the level of the headlamp is required to follow the level of the target line when the cutoff line is lower or higher than the target line according to the comparison result of the headlamp level comparator 300. Furthermore, in the headlamp level correcting operation S400, a control to perform a correction of raising the level of the headlamp such that the cutoff line reaches the height of the target line when the level of the cutoff line is lower than the target line and to perform a correction of lowering the level of the headlamp such that the cutoff line reaches the height of the target line when the level of the cutoff line is higher than the target line may be performed.

Then, in the headlamp level correcting operation S500, a correction of raising or lowering the level of the headlamp such that the cutoff line of the headlamp reaches the target line may be automatically performed when a headlamp leveling device (HLLD) of an automatic correction type, which may automatically adjust the level of the headlamp, is provided, whereby the light of the headlamp may be minimized from causing inconvenience to driving of the preceding vehicle or the vehicle that travels on an opposite lane while a sight of the driver is stably secured. Accordingly, when the headlamp leveling device (HLLD) of an automatic correction type is provided, a primary correction of the lighting angle of the headlamp is promptly performed according to a result recognized by a sensor and the like provided therein, and then, the lighting angle of the headlamp may be additionally raised or lowered to reach the target line in the headlamp level correcting operation S500.

Furthermore, in the headlamp level correcting operation S500, an indication such as a warning that requests performance of a correction of raising or lowering the level of the headlamp may be output such that the cutoff line of the headlamp reaches the target line in a form of a voice of a message including a popup window may be recognized by the driver when the headlamp leveling device (HLLD) of a switch type, in which adjustment of the level of the headlamp depends on manipulation by the driver is provided.

Further, the present disclosure may include a headlamp level indicating operation S400 of allowing the driver to intuitively recognize whether it is necessary to correct the lighting angle of the headlamp and providing information on a correction direction and a correction degree together by indicating a front image including the preceding vehicle on the display unit provided in the vehicle and indicating the target line and the cutoff line together on the image of the preceding vehicle in a superimposition way whereby the driver may recognize the determination result in the headlamp level comparing operation S300. Accordingly, in the headlamp level indicating operation S400, the image of the preceding vehicle, the cutoff line, and the target line may be indicated together on the display unit that displays the image of the multifunctional camera (MFC).

Additionally, in the headlamp level indicating operation S400, the image of the preceding vehicle, which is captured by the multifunctional camera (MFC) provided in the vehicle, the cutoff line, and the target line may be indicated together on the windshield glass when data that may be visually recognized by the driver may be output on a windshield glass through ahead-up display (HUD) provided in the vehicle. Then, in a HUD screen, a distance, by which the cutoff line has to be raised or lowered to follow the height of the target line, may be calculated and indicated or output together.

Accordingly, since the level comparison result of the current cutoff line of the headlamp and the target line may be provided to allow the driver to visually recognize the result through the screen of the multifunctional camera (MFC) or the head-up display (HUD), convenience of manipulation of the headlamp may be improved during nighttime driving of the vehicle. Furthermore, since the comparison of the cutoff line of the headlamp and the target line and the following control may be possible based on the image of the preceding vehicle captured by the camera provided in the vehicle in advance, additional costs for the execution may be minimized and the present disclosure may be applied to the vehicle more easily.

Next, a flow of correcting the level of the headlamp by comparing the cutoff line of the headlamp with the target line according to the present disclosure will be described with reference to FIG. 17. As illustrated in FIG. 17, it may be determined whether a preceding vehicle is present on a front side of the vehicle, a lighting angle of the headlamp may be maintained at a previous value when no preceding vehicle is present (No), a number plate frame image may be extracted from an image of the preceding vehicle, which is captured by a camera provided in the vehicle when a preceding vehicle is present, and then a transverse length and a longitudinal length of the number plate frame image may be measured and analyzed.

Additionally, an inter-vehicle distance to the preceding vehicle may be calculated by using a decrease ratio of the transverse length of the number plate frame and the transverse length of the standard of the actual number plate frame. Then, the inter-vehicle distance calculated by using the proportional relationship of the number plate frame image may be compared with the inter-vehicle distance to the preceding vehicle recognized by the measured value of the front radar sensor provided in the vehicle.

Thereafter, since the inter-vehicle distance is calculated again when the difference of the inter-vehicle distances exceeds a preset error range (No) and the inter-vehicle distance is specified when the difference is within the preset error range (Yes), the longitudinal length of the number plate frame image may be equally divided into a plurality of unit areas having a specific height to calculate the level of the target line from the specified inter-vehicle distance.

Furthermore, the rear area of the preceding vehicle may be divided into heights of unit areas to calculate the height of the area from a lower end of the number plate frame to a ground surface with a sum of the heights of the unit areas.

Thereafter, after the level of the target line is calculated from the specified inter-vehicle distance, it may be determined which location of the plurality of unit areas that form the rear area of the preceding vehicle corresponds to the level of the target line.

Furthermore, it may be calculated which location of the plurality of unit areas that form the rear area of the preceding vehicle the level of the cutoff line, at which the light irradiated from the headlamp of the vehicle reaches the rear area of the preceding vehicle, reaches. When the vehicle includes a head-up display (HUD) (Yes), convenience of intuitive recognition of the driver may be achieved by indicating a comparison result of the cutoff line of the headlamp and the target line. When the vehicle does not include a head-up display (HUD) (No), recognition of the driver may be achieved by indicating the comparison result of the cutoff line of the headlamp and the target line on the screen of the multifunctional camera (MFC). When the vehicle includes an automatic correction device that may automatically correct the lighting angle of the headlamp (Yes), the lighting angle of the headlamp may be automatically raised or lowered until the cutoff line of the headlamp reaches the level of the target line.

Particularly, it is apparent that the driver may be informed that the correction is made, through a popup image or a voice. When the vehicle does not include an automatic correction device that may automatically correct the lighting angle of the headlamp (No), the driver may be informed by a popup message or a voice that requests the driver to adjust the lighting angle of the headlamp such that the lighting angle of the headlamp is raised or lowered. Thereafter, the lighting angle of the headlamp may be manually corrected by manipulating a switch and the like by the driver such that the cutoff line of the headlamp reaches the level of the target line.

Thereafter, when a posture of the vehicle is changed due to a change in the weight of cargo or passengers on board or a change in the location of the cargo or passengers, the lighting angle of the headlamp may be changed while the front side of the vehicle is pressed or raised, and it may be determined whether it is necessary to correct the lighting angle of the headlamp while determining whether a preceding vehicle is present again.

According to the present disclosure, the level of the cutoff line of the headlamp may be more precisely and conveniently corrected by comparing the cutoff line of the headlamp and the target line based on the image of the preceding vehicle, which is captured by the camera provided in the vehicle and adjust the level of the headlamp such that the level of the headlamp follows the level of the target line, and thus minimizing addition of sensors and minimizing an increase of costs.

Furthermore, according to the present disclosure, because the level comparison result of the current cutoff line of the headlamp and the target line may be provided so that the driver may visually recognize the result through the screen of the multifunctional camera (MFC) or the head-up display (HUD), the driver may intuitively determine a correction of the level of the headlamp, thereby improving convenience of manipulation of the headlamp during nighttime driving. In addition, the present disclosure may provide various effects that are directly or indirectly recognized.

The above description is a simple exemplification of the technical spirit of the present disclosure, and the present disclosure may be variously corrected and modified by those skilled in the art to which the present disclosure pertains without departing from the essential features of the present disclosure.

Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the genuine technical scope of the present disclosure should be construed by the attached claims, and all the technical spirits within the equivalent ranges fall within the scope of the present disclosure.

What is claimed is:

1. An apparatus for correcting a level of a headlamp, the apparatus comprising:
   a number plate frame image extractor configured to acquire a number plate frame image from an image of a preceding vehicle, which is captured by a camera provided in a subject vehicle;
   a number plate frame analyzer configured to calculate an inter-vehicle distance to the preceding vehicle using a transverse length of the number plate frame image, and to divide a height standard of a rear area of the preceding vehicle, by which the number plate frame is spaced apart from a ground surface, into a plurality of unit areas, using a longitudinal length of the number plate frame image;
   a headlamp level comparator configured to compare a level of a cutoff line, at which light of the headlamp reaches the preceding vehicle with a level of a target line that is a preset ideal cutoff line, and to determine a necessity for correction of the level of the headlamp; and
   a headlamp level corrector configured to raise the level of the headlamp in response to determining that the level of the cutoff line is lower than the target line and lower the level of the headlamp when the level of the cutoff line is higher than the target line to perform a correction such that the cutoff line of the headlamp follows the level of the target line at the corresponding inter-vehicle distance.

2. The apparatus of claim 1, wherein the number plate frame analyzer includes:
   a distance calculator configured to calculate the inter-vehicle distance to the preceding vehicle by using the transverse length of the number plate frame image; and
   a height standard divider configured to equally divide the height standard of the rear area of the preceding vehicle, by which the number plate frame is spaced apart from the ground surface, into heights of the plurality of unit areas, using the longitudinal length of the number plate frame image.

3. The apparatus of claim 2, wherein the distance calculator is configured to calculate the inter-vehicle distance to the preceding vehicle by comparing the transverse length of the number plate frame image, which is measured on the number plate frame image, with a transverse length of a standard of a number plate to derive a proportional relationship thereof.

4. The apparatus of claim 2, wherein the number plate frame analyzer is configured to correct a result of the inter-vehicle distance calculated by the distance calculator, by using the inter-vehicle distance to the preceding vehicle, which is measured by a front radar sensor provided in the vehicle.

5. The apparatus of claim 2, wherein the height standard divider is configured equally divide the longitudinal length of the number plate frame that appears on the number plate frame image into a plurality of unit areas having the same height, and then equally divide the height standard of the rear area of the preceding vehicle, from the lower end of the number plate frame to the ground surface, into the unit areas.

6. The apparatus of claim 2, wherein the headlamp level corrector is configured to perform a correction of raising or lowering the level of the headlamp automatically to cause the cutoff line of the headlamp to reach the target line when a headlamp level adjusting device of an automatic correction type, by which the level of the headlamp is automatically adjusted.

7. The apparatus of claim 6, wherein the correction is performed by proactively performing a primary correction of the headlamp level according to a result recognized by a sensor provided therein when the headlamp level adjusting device of the automatic correction type is provided, and additionally raising or lowering the level of the headlamp such that the cutoff line of the headlamp reaches the target line by the headlamp level corrector.

8. The apparatus of claim 2, wherein the headlamp level corrector is configured to output a voice or a popup message that requests performance of a correction of raising or lowering the level of the headlamp to cause the cutoff line of the headlamp to reach the target line, when a headlamp level adjusting device of a switch type is provided.

9. The apparatus of claim 2, further comprising:
a headlamp level indicator configured to output the target line and the cutoff line together on the preceding vehicle image while outputting a front image including the preceding vehicle on a display unit provided in the vehicle.

10. The apparatus of claim 9, wherein the headlamp level indicator is configured to output the image of the preceding vehicle, the cutoff line, and the target line together on a windshield glass when the vehicle is provided with a head up display (HUD).

11. A method for correcting a level of a headlamp, the method comprising:
acquiring, by a controller, a number plate frame image from an image of a preceding vehicle, which is captured by a camera provided in a subject vehicle;
calculating, by the controller, an inter-vehicle distance to the preceding vehicle by using a transverse length of the number plate frame image, and dividing a height standard of a rear area of the preceding vehicle, by which the number plate frame is spaced apart from a ground surface, into a plurality of unit areas, using a longitudinal length of the number plate frame image;
comparing, by the controller, a level of a cutoff line, at which light of the headlamp reaches the preceding vehicle with a level of a target line that is a preset ideal cutoff line, and determining a necessity for correction of the level of the headlamp; and
raising, by the controller, the level of the headlamp in response to determining that the level of the cutoff line is lower than the target line and lowering the level of the headlamp when the level of the cutoff line is higher than the target line to perform a correction such that the cutoff line of the headlamp follows the level of the target line at the corresponding inter-vehicle distance.

12. The method of claim 11, wherein the analyzing of the number plate frame includes:
calculating, by the controller, the inter-vehicle distance to the preceding vehicle using the transverse length of the number plate frame image; and
equally dividing, by the controller, the height standard of the rear area of the preceding vehicle, by which the number plate frame is spaced apart from the ground surface, into the plurality of unit areas, using the longitudinal length of the number plate frame image.

13. The method of claim 12, wherein the calculating of the distance includes:
calculating, by the controller, the inter-vehicle distance to the preceding vehicle by comparing the transverse length of the number plate frame image, which is measured on the number plate frame image, with a transverse length of a standard of a number plate to derive a proportional relationship thereof.

14. The method of claim 12, wherein a result of the inter-vehicle distance calculated in the calculating of the distance is corrected using the inter-vehicle distance to the preceding vehicle, which is measured by a front radar sensor provided in the vehicle.

15. The method of claim 12, wherein the dividing of the height standard includes:
equally dividing, by the controller, the longitudinal length of the number plate frame that appears on the number plate frame image into a plurality of unit areas having the same height, and then equally dividing the height standard of the rear area of the preceding vehicle, from the lower end of the number plate frame to the ground surface, into heights of the unit areas.

16. The method of claim 12, wherein the correcting of the headlamp level includes:
performing, by the controller, a correction of raising or lowering the level of the headlamp is automatically performed to cause the cutoff line of the headlamp to reach the target line when a headlamp level adjusting device of an automatic correction type, by which the level of the headlamp is automatically adjusted.

17. The method of claim 16, wherein the correction is performed by proactively performing a primary correction of the headlamp level according to a result recognized by a sensor provided therein when the headlamp level adjusting device of the automatic correction type is provided, and additionally raising or lowering the level of the headlamp such that the cutoff line of the headlamp reaches the target line in the correcting of the headlamp level.

18. The method of claim 12, wherein the correcting of the headlamp level includes:
outputting, by the controller, a voice or a popup message that requests performance of a correction of raising or lowering the level of the headlamp such that the cutoff line of the headlamp reaches the target line, when a headlamp level adjusting device of a switch type is provided.

19. The method of claim 12, further comprising:
outputting, by the controller, the target line and the cutoff line together on the preceding vehicle image while outputting a front image including the preceding vehicle on a display unit provided in the vehicle.

20. The method of claim 12, wherein the indicating of the headlamp level includes:
outputting, by the controller, the image of the preceding vehicle, the cutoff line, and the target line together on a windshield glass when the vehicle is provided with a head up display (HUD).

* * * * *